Oct. 22, 1968  D. C. RUSCHMAN ET AL  3,406,832

SERIES PARALLEL FILTER ELEMENT

Filed June 10, 1964  2 Sheets-Sheet 1

INVENTORS
Donald C. Ruschman &
Fred O. Schulte

George E. Johnson
ATTORNEY

Oct. 22, 1968     D. C. RUSCHMAN ET AL     3,406,832
SERIES PARALLEL FILTER ELEMENT
Filed June 10, 1964     2 Sheets-Sheet 2
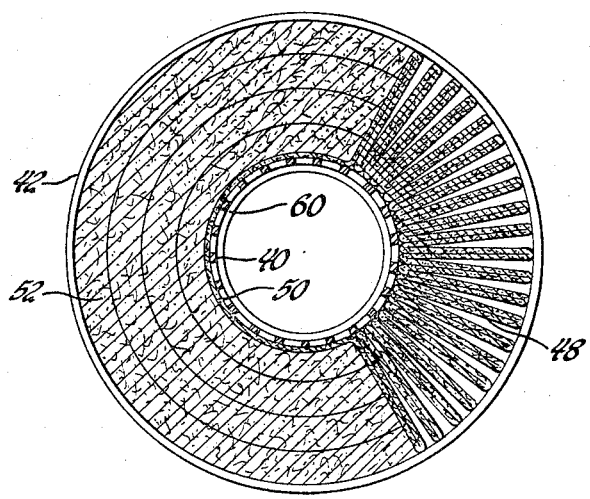
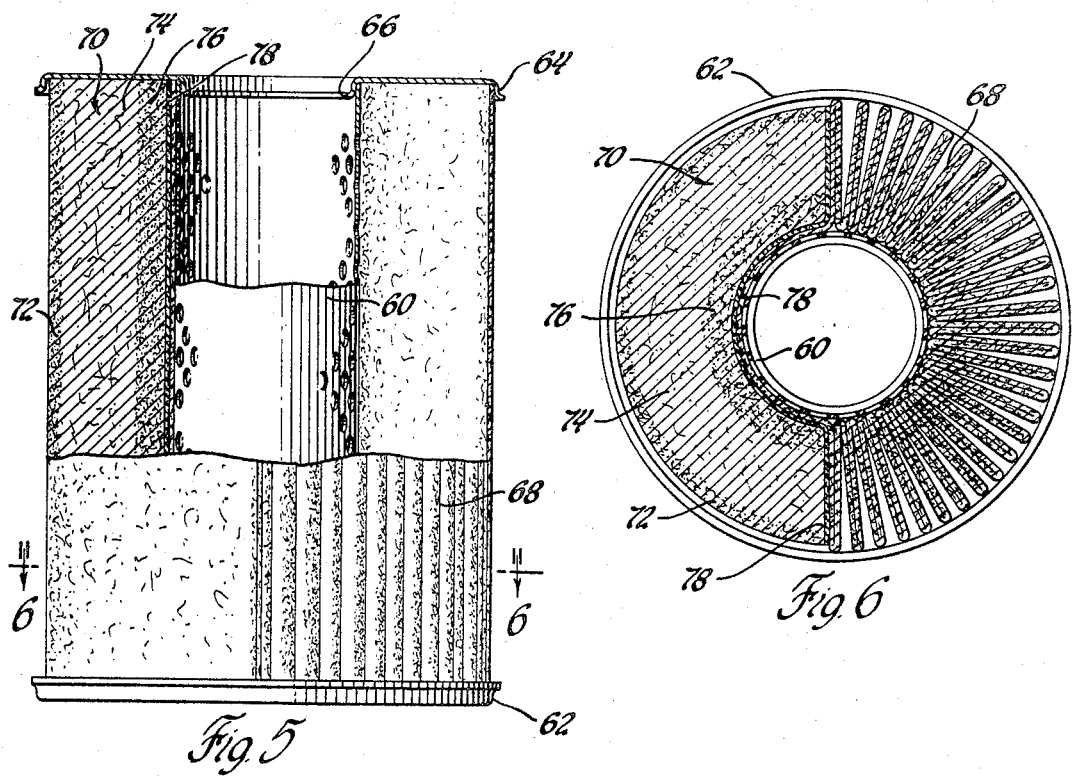
INVENTORS
Donald C. Ruschman &
Fred O. Schulte
George E. Johnson
ATTORNEY cloth# United States Patent Office 3,406,832
Patented Oct. 22, 1968

3,406,832
SERIES PARALLEL FILTER ELEMENT
Donald C. Ruschman, Davison, and Fred O. Schulte, Fenton, Mich., assignors to General Motors Corporation, Detroit, Mich., a corporation of Delaware
Filed June 10, 1964, Ser. No. 373,977
10 Claims. (Cl. 210—457)

ABSTRACT OF THE DISCLOSURE

A filter element having depth type and surface type filter media arranged in parallel and in series with the surface type filter medium governing the size of particles passed through the element.

---

This invention relates to filters and more particularly to filter elements each of which is particularly adapted for insertion or mounting as a self-contained cartridge in a fluid line such as a lubricating oil line for serving an internal combustion engine.

Oil filtering elements as utilized in automobiles fall generally into two categories: (1) the surface type, and (2) the depth type. Each has potential advantages. The surface type is characterized by a thin sheet filter medium which monitors or controls particle size passing through the element—i.e.—dirt particles which are larger than the pore size of the paper, fine mesh screen or synthetic sheet material making up the element are positively retained by the latter. The depth type is characterized by a mass filter medium which gives an excellent oil penetration and extremely fine particles of dirt are trapped by it without premature pore blockage. It has now been discovered that in the use of the present invention a filter element, as a unit, may provide the above advantages of both types to obtain filtering efficiency and long filter life.

An object of the present invention is to provide an improved filter element with a predetermined dirt particle retention rating and which is conducive to thorough filtering action of fluid passed through it.

A feature of the present invention is a filter element having a surface type filtering medium having different portions thereof in series and also in parallel with a depth type filtering medium. Another feature is a filter element comprising a surface type filtering medium and a depth type filter medium, a portion of the surface type filtering medium being in parallel with the depth type filtering medium and one other portion of the surface type filtering medium being in series with the depth type filtering medium and downstream therefrom.

This and other important features of the invention will now be described in detail in the specification and then pointed out more particularly in the appended claims.

In the drawings:

FIGURE 4 is a sectional view looking in the direction of the arrows 4—4 in FIGURE 3;

FIGURE 5 is a third embodiment of the invention; and

FIGURE 6 is a sectional view looking in the direction of the arrows 6—6 in FIGURE 5.

Figure 1:
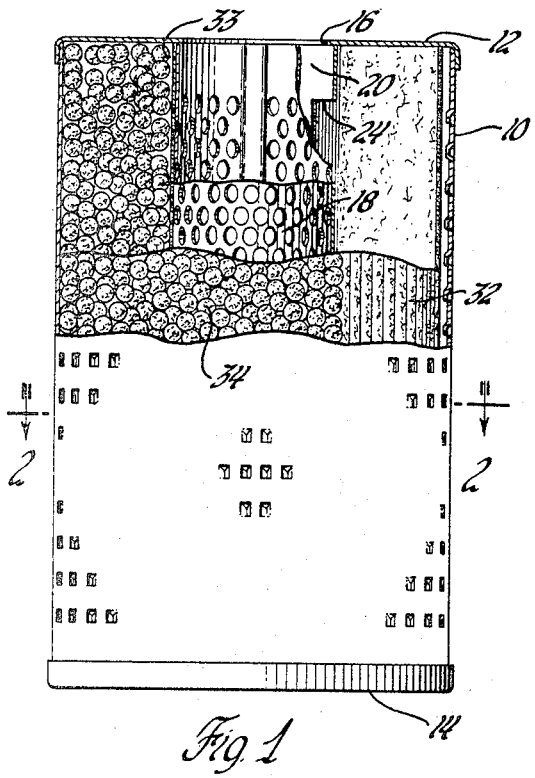
FIGURE 1 is an elevation view with parts broken away, illustrating one embodiment of the present invention.
Figure 2:
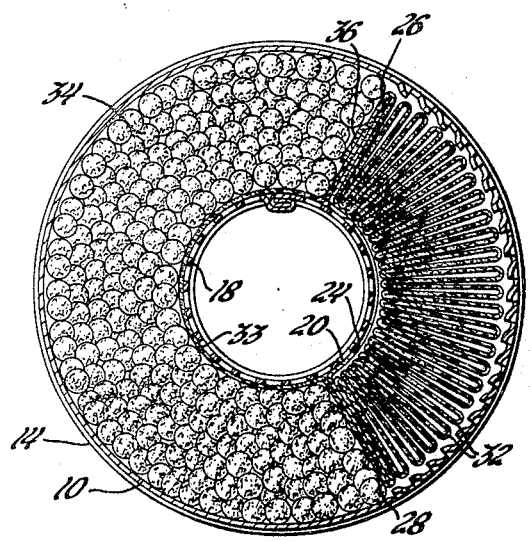
FIGURE 2 is a sectional view looking in the direction of the arrows 2—2 in FIGURE 1.

FIGURES 1 and 2 depict a cartridge type filter element comprising a perforated cylindrical casing 10 fitted with two end covers 12 and 14. The end cover 12 has a central opening 16 and the cover 14 may have the same opening if desired for a given installation or it may be imperforate. The opening 16 communicates with the interior of a perforated center tube 18 which is coaxial with the casing 10. A sheet metal retainer generally indicated at 20 conforms with a portion of the outside surface of the center tube 18 and is provided with several radially directed large openings 24 as well as two radial wings 26 and 28 (FIGURE 2).

A surface type filter medium in the form of plastic impregnated paper encompasses the center tube 18 and a portion thereof is pleated as at 32 whereas one other portion 33 thereof follows smoothly around and in contact with the center tube. Opposite margins of the filter paper are joined together as at 36 (FIGURE 2) by a suitable adhesive. The pleats 32 are made to extend radially from the axis of the cartridge and along the length of the latter and are held in position by means of the retainer 20 as best seen in FIGURE 2. The arcuate space between the casing 10 and the center tube 18 determined by the retainer 20 and not including the pleats 32 is packed with a depth type mass 34. This medium is in the form of discrete pellets and is specifically described in the United States patent application Ser. No. 251,871, now Patent No. 3,219,194, entitled "Filter Mass of Furred Nodules" and filed Jan. 16, 1963, in the names of Karl Schwartzwalder and George E. Suchy. Obviously, another form of packed filter mass medium may be utilized in place of the pellets as will be seen as the description proceeds.

Oil to be purified by the filter element enters through the perforated casing 10 and passes through the surface type filter medium of the pleats 32 and into the center tube 18 for discharge in clarified condition through the opening 16. Simultaneously with this action, oil also passes through the perforated wall of the container 10 and through the nodules or mass 34 and then through the surface filter medium at 33 into the center tube for discharge. From this, it may be seen that a series-parallel flow of oil through the filter element may be established.

Figure 3:
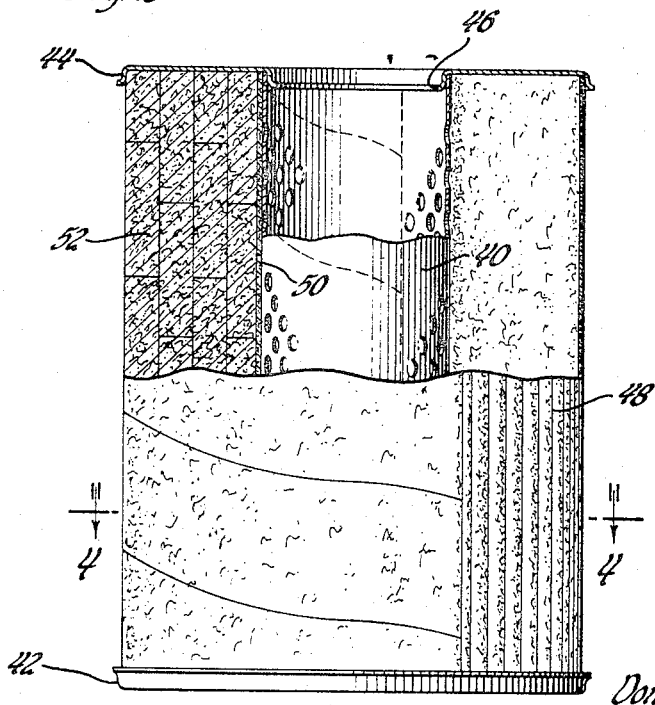
FIGURE 3 is a view similar to that of FIGURE 1 but showing a second embodiment of the invention.

FIGURES 3 and 4 show a modification in which an exterior cylindrical casing is not needed. In this form, a perforated center tube 40 is employed and this is provided with two end caps 42 and 44. The latter has a central opening 46 communicating with the interior of a perforated center tube 40.

A surface type filter element in the form of a paper is made with one portion 48 composed of longitudinal pleats and another arcuate portion 50 closely conforming with the surface of the center tube 40. Conforming with the portion 50 of the surface type medium is a segment 52 of a depth type filter mass. This mass is made by wrapping strips of felt on a cylindrical mandrel and adhering the felt layers thereof with a hot melt adhesive so that the section will retain its form when cut to the desired shape. This use of an integral depth section in the series parallel filter element eliminates the necessity for an outer shell such as the casing 10 and also the retainer 20 of FIGURE 1. This form of construction also makes it possible to have a greater density in which the layers of felt have different pore sizes beginning with a relative dense material adjacent to the center tube 40. Each successive layer of felt consists of a more open material. The larger dirt particles are retained in the outer felt layers while the finer dirt particles pass through the inner layers of felt where they are trapped. The use of this graded porosity results in a more uniform distribtuion of dirt in the depth section than can ordinarily be obtained in the conventional monodensity depth material.

FIGURES 5 and 6 show a third modification which does not necessitate the use of an outer casing or a retainer for separating pleats from the mass filter medium. In this version a perforated center tube 60 is employed with two end caps or covers 62 and 64. The latter cover has a central clarified oil discharge opening 66. A surface type filter medium is provided in the form of radial paper pleats 68 which extend approximately halfway around the center tube 60 and the paper then continues smoothly for the rest of the circumference of the tube and in contact with the exterior surface of the latter. In parallel with the pleats 68 is a molded depth type section 70 consisting of layers of cellulose fibers. The section retains the shape shown because inner and outer layers are impregnated with thermosetting resin which is cured while the section is in the mold. The depth section 70 illustrates another form of the graded density concept. It has an outer layer 72 of resin impregnated jute, a central layer 74 of impregnated cotton, an inner layer 76 of impregnated cotton and a paper overlay 78 which is placed adjacent to the surface type medium as best shown in FIGURE 6.

In the series parallel arrangement of each of the modifications, the depth type filter 34, 52, or 70 does not control the degree of particle size retention and is subject to migration of the medium and "unloading" of dirt. Because of this fact, the placing of the surface type medium or paper entirely around the center tube serves mechanically to trap all particles which are of sufficient size to cause rapid wear of engine parts. All of the oil which passes through the filter element must pass through the surface type medium and this determines the maximum size particle which can pass through the element as a whole. The mass medium contributes to longer overall filter life and particularly if the graded concept is used, a more uniform distribution of dirt is obtained compared with a mono-density depth medium.

We claim:

1. A filter element having a surface type filtering medium in thin sheet form having two differently formed continuous portions and a depth type filtering medium in the form of a thick mass, a portion of said surface type filtering medium being pleated and arranged in parallel and out of contact with said depth type filtering medium, and the remaining portion of said surface type filtering medium extending smoothly and continuously from one end of said pleated portion to the other end thereof, and in series with and downstream from said depth type filtering medium.

2. A filter element as set forth in claim 1, a perforated center tube, said surface type filtering medium surrounding said tube, said remaining portion of said surface type filtering medium being interposed between said depth type filtering medium and said tube.

3. A filter element as set forth in claim 1 and including a perforated center tube and end plates, said filtering medium surrounding said tube, said end plates abutting opposite ends of the tube and element, and at least one of said end plates having a discharge opening in communication with said tube.

4. A filter element as set forth in claim 1, and said depth type filtering medium having a density increasing toward said remaining portion of said surface type filtering medium.

5. A filter element as set forth in claim 1 in which said depth type filtering medium is in the form of a molded and integral mass.

6. A filter element in the form of a cartridge having perforated central and outer tubes joined by end caps, one of said caps having a central opening in communication with the central tube, a sheet of filter paper formed into pleats extending lengthwise of said tubes and around a part of the circumference of said central tube, said sheet of filter paper extending smoothly around the remaining part of the central tube circumference, and a mass filter medium outside said filter paper and arranged in parallel with said pleats.

7. A filter element in the form of a cartridge having end caps joined by a central perforated tube, one of said caps having a central opening in communication with said tube, a sheet of filter paper surrounding said tube and having one part in the form of pleats and one other part following the contour of said tube and a depth type filter mass medium outside said one other part and arranged in parallel with said pleats.

8. A filter element as set forth in claim 7, the filter mass medium being flowable, and a perforated outer casing confining said filter mass medium.

9. A filter element as set forth in claim 7, the filter mass medium being a unitary structure.

10. A filter element as set forth in claim 7, the filter mass medium differing in porosity from the outside of the element to the central tube.

References Cited

UNITED STATES PATENTS

| | | | |
|---|---|---|---|
| 2,386,684 | 10/1945 | Hermanson | 210—489 |
| 2,675,127 | 4/1954 | Layte | 210—489 X |
| 2,833,416 | 5/1958 | Wilkinson | 210—440 X |
| 2,850,168 | 9/1958 | Nostrand. | |
| 3,043,436 | 7/1962 | Farrey | 210—484 |
| 3,127,341 | 3/1964 | Abeles | 210—493 |
| 3,219,194 | 11/1965 | Schwartzwalder et al. | 210—508 |
| 3,288,299 | 11/1966 | Paton et al. | 210—493 X |

FOREIGN PATENTS

| | | |
|---|---|---|
| 1,309,891 | 10/1962 | France. |

REUBEN FRIEDMAN, *Primary Examiner.*

J. ADEE, *Assistant Examiner.*